United States Patent
Colannino et al.

(10) Patent No.: US 10,088,154 B2
(45) Date of Patent: Oct. 2, 2018

(54) DOWN-FIRED BURNER WITH A PERFORATED FLAME HOLDER

(71) Applicant: CLEARSIGN COMBUSTION CORPORATION, Seattle, WA (US)

(72) Inventors: Joseph Colannino, Bellevue, WA (US); Douglas W. Karkow, Des Moines, WA (US); Igor A. Krichtafovitch, Kirkland, WA (US); Christopher A. Wiklof, Everett, WA (US)

(73) Assignee: CLEARSIGN COMBUSTION CORPORATION, Seattle, WA (US)

( * ) Notice: Subject to any disclaimer, the term of this patent is extended or adjusted under 35 U.S.C. 154(b) by 120 days.

(21) Appl. No.: 15/235,479

(22) Filed: Aug. 12, 2016

(65) Prior Publication Data

US 2017/0038064 A1    Feb. 9, 2017

Related U.S. Application Data

(63) Continuation of application No. PCT/US2015/015550, filed on Feb. 12, 2015, which
(Continued)

(51) Int. Cl.
*B01J 8/06* (2006.01)
*F23D 14/26* (2006.01)
(Continued)

(52) U.S. Cl.
CPC ............. *F23D 14/26* (2013.01); *B01J 8/067* (2013.01); *C01B 3/384* (2013.01); *C01B 3/48* (2013.01); *F23C 99/006* (2013.01); *F23D 11/406* (2013.01); *F23D 14/30* (2013.01); *F23D 14/70* (2013.01); *B01J 2208/00504* (2013.01); *B01J 2208/065* (2013.01); *C01B 2203/0233* (2013.01); *C01B 2203/0816* (2013.01); *C01B 2203/1011* (2013.01); *F23D 2900/14125* (2013.01)

(58) Field of Classification Search
CPC ........................................................ F23C 99/006
USPC ............................................... 431/170, 11, 20
See application file for complete search history.

(56) References Cited

U.S. PATENT DOCUMENTS 2,095,065 A    10/1937    Hays
3,076,605 A     2/1963    Holden
(Continued)

FOREIGN PATENT DOCUMENTS

EP        2738460       6/2014
JP        60-073242     4/1985
(Continued)

OTHER PUBLICATIONS

PCT International Search Report and Written Opinion of PCT Application No. PCT/US2015/015550 dated Jun. 29, 2015.
(Continued)

*Primary Examiner* — Avinash Savani
(74) *Attorney, Agent, or Firm* — Christopher A. Wiklof; Nicholas S. Bromer; Launchpad IP, Inc.

(57) ABSTRACT

A down-fired flame burner includes a flame holder positioned below the burner. The flame holder includes a plurality of perforations that collectively confine a combustion reaction of the burner to the flame holder.

43 Claims, 11 Drawing Sheets

Related U.S. Application Data is a continuation of application No. PCT/US2014/016632, filed on Feb. 14, 2014, and a continuation of application No. PCT/US2014/016622, filed on Feb. 14, 2014.

(60) Provisional application No. 62/036,967, filed on Aug. 13, 2014.

(51) Int. Cl.
| | | |
|---|---|---|
| *F23C 99/00* | (2006.01) | |
| *F23D 11/40* | (2006.01) | |
| *F23D 14/30* | (2006.01) | |
| *F23D 14/70* | (2006.01) | |
| *C01B 3/38* | (2006.01) | |
| *C01B 3/48* | (2006.01) | |

(56) References Cited

U.S. PATENT DOCUMENTS

| | | | |
|---|---|---|---|
| 3,228,614 A | 1/1966 | Bauer | |
| 3,324,924 A | 6/1967 | Hailstone et al. | |
| 3,669,041 A * | 6/1972 | Schworer | F23C 1/00 110/193 |
| 4,021,188 A | 5/1977 | Yamagishi et al. | |
| 4,081,958 A * | 4/1978 | Schelp | F02C 7/14 431/170 |
| 4,397,356 A | 8/1983 | Retallick | |
| 4,408,461 A | 10/1983 | Bruhwiler et al. | |
| 4,483,673 A | 11/1984 | Murai et al. | |
| 4,588,373 A | 5/1986 | Tonon et al. | |
| 4,643,667 A | 2/1987 | Fleming | |
| 4,673,349 A | 6/1987 | Abe et al. | |
| 4,726,767 A | 2/1988 | Nakajima | |
| 4,752,213 A | 6/1988 | Grochowski et al. | |
| 4,850,862 A | 7/1989 | Bjerklie | |
| 5,235,667 A | 8/1993 | Canfield et al. | |
| 5,248,255 A | 9/1993 | Morioka et al. | |
| 5,326,257 A | 7/1994 | Taylor et al. | |
| 5,439,372 A | 8/1995 | Duret et al. | |
| 5,441,402 A | 8/1995 | Reuther et al. | |
| 5,511,516 A | 4/1996 | Moore, Jr. et al. | |
| 5,718,573 A | 2/1998 | Knight et al. | |
| 5,890,886 A * | 4/1999 | Doker | F23C 99/006 431/170 |
| 5,899,686 A | 5/1999 | Carbone et al. | |
| 5,993,192 A | 11/1999 | Schmidt et al. | |
| 6,257,868 B1 * | 7/2001 | Durst | F23C 99/006 431/11 |
| 6,997,701 B2 | 2/2006 | Volkert et al. | |
| 7,360,506 B2 | 4/2008 | Shellenberger et al. | |
| 9,377,190 B2 | 6/2016 | Karkow et al. | |
| 9,388,981 B2 | 7/2016 | Karkow et al. | |
| 2002/0155403 A1 | 10/2002 | Griffin et al. | |
| 2003/0054313 A1 | 3/2003 | Rattner et al. | |
| 2004/0058290 A1 | 3/2004 | Mauzey et al. | |
| 2004/0081933 A1 | 4/2004 | St. Charles et al. | |
| 2006/0084017 A1 | 4/2006 | Huebner et al. | |
| 2007/0099141 A1 * | 5/2007 | Joshi | B01J 8/062 431/354 |
| 2008/0268387 A1 | 10/2008 | Saito et al. | |
| 2009/0111063 A1 | 4/2009 | Boardman et al. | |
| 2010/0178219 A1 | 7/2010 | Verykios et al. | |
| 2011/0076628 A1 | 3/2011 | Miura et al. | |
| 2012/0164590 A1 | 6/2012 | Mach | |
| 2013/0336352 A1 | 12/2013 | Colannino et al. | |
| 2015/0118629 A1 | 4/2015 | Colannino et al. | |
| 2015/0276217 A1 | 10/2015 | Karkow et al. | |
| 2015/0276220 A1 | 10/2015 | Karkow et al. | |
| 2015/0285491 A1 | 10/2015 | Karkow et al. | |
| 2015/0316261 A1 | 11/2015 | Karkow et al. | |
| 2015/0330625 A1 | 11/2015 | Karkow et al. | |
| 2015/0362177 A1 | 12/2015 | Krichtafovitch et al. | |
| 2015/0362178 A1 | 12/2015 | Karkow et al. | |
| 2015/0369477 A1 | 12/2015 | Karkow et al. | |
| 2016/0003471 A1 | 1/2016 | Karkow et al. | |
| 2016/0018103 A1 | 1/2016 | Karkow et al. | |
| 2016/0025333 A1 | 1/2016 | Karkow et al. | |
| 2016/0025374 A1 | 1/2016 | Karkow et al. | |
| 2016/0025380 A1 | 1/2016 | Karkow et al. | |
| 2016/0091200 A1 | 3/2016 | Colannino et al. | |
| 2016/0230984 A1 | 8/2016 | Colannino et al. | |

FOREIGN PATENT DOCUMENTS

| | | |
|---|---|---|
| JP | 06-026624 | 2/1994 |
| JP | 07-083076 | 3/1995 |
| JP | 2006-275482 | 10/2006 |
| WO | WO 1995/000803 | 1/1995 |
| WO | WO 2015/042615 | 3/2015 |
| WO | WO 2015/054323 | 4/2015 |
| WO | WO 2015/061760 | 4/2015 |
| WO | WO 2015/070188 | 5/2015 |
| WO | WO 2015/112950 | 7/2015 |
| WO | WO 2015/123149 | 8/2015 |
| WO | WO 2015/123670 | 8/2015 |
| WO | WO 2015/123683 | 8/2015 |
| WO | WO 2015/123694 | 8/2015 |
| WO | WO 2015/123696 | 8/2015 |
| WO | WO 2015/123701 | 8/2015 |
| WO | WO 2016/007564 | 1/2016 |

OTHER PUBLICATIONS

PCT International Search Report and Written Opinion of PCT Application No. PCT/US2014/016632 dated May 26, 2014.
PCT International Search Report and Written Opinion of PCT Application No. PCT/US2014/016622 dated May 27, 2014.
Fric, Thomas F., "Effects of Fuel-Air Unmixedness on NOx Emissions," Sep.-Oct. 1993. Journal of Propulsion and Power, vol. 9, No. 5, pp. 708-713.
Arnold Schwarzenegger, "A Low NOx Porous Ceramics Burner Performance Study," California Energy Commission Public Interest Energy Research Program, Dec. 2007, San Diego State University Foundation, p. 5.
Howell, J.R., et al.; "Combustion of Hydrocarbon Fuels Within Porous Inert Media," Dept. of Mechanical Engineering, The University of Texas at Austin. Prog. Energy Combust. Sci., 1996, vol. 22, p. 121-145.

\* cited by examiner

DOWN-FIRED BURNER WITH A PERFORATED FLAME HOLDER

CROSS REFERENCE TO RELATED APPLICATIONS

The present application is a U.S. Continuation Application which claims priority benefit under 35 U.S.C. § 120 of co-pending International Patent Application No. PCT/US2015/015550, entitled "DOWN-FIRED BURNER WITH A PERFORATED FLAME HOLDER," filed Feb. 12, 2015. Co-pending International Patent Application No. PCT/US2015/015550 claims priority benefit from and is a Continuation of International Patent Application No. PCT/US2014/016632, entitled "FUEL COMBUSTION WITH A PERFORATED REACTION HOLDER," filed Feb. 14, 2014. Co-pending International Patent Application No. PCT/US2015/015550 also claims priority to and is a Continuation-in-Part of International Patent Application No. PCT/US2014/016622, entitled "STARTUP METHOD AND MECHANISM FOR A BURNER HAVING A PERFORATED FLAME HOLDER," filed Feb. 14, 2014. Co-pending International Patent Application No. PCT/US2015/015550 also claims priority from U.S. Provisional Patent Application No. 62/036,967, entitled "DOWNFIRED BURNER WITH A PERFORATED FLAME HOLDER," filed Aug. 13, 2014. Co-pending International Patent Application No. PCT/US2015/015550, International Patent Application No. PCT/US2014/016632, International Patent Application No. PCT/US2014/016622, and U.S. Provisional Patent Application No. 62/036,967 are each, to the extent not inconsistent with the disclosure herein, incorporated by reference.

BACKGROUND

Steam-methane reforming is a process whereby methane ($CH_4$) is converted to hydrogen ($H_2$) by the addition of steam ($H_2O$) and heat over a catalyst. Although the chemistry for $CH_4$ is illustrated, other light hydrocarbons can be used as well. This process is usually accomplished in two phases. The first reaction occurs in a primary reformer where a flame is used to supply the necessary heat to convert methane to carbon monoxide and hydrogen via reaction 1:

$$CH_4 + H_2O \rightarrow CO + 3H_2. \quad \quad 1)$$

The second reaction is slightly exothermic and occurs in shift reactors outside the primary reformer where carbon monoxide is further converted to carbon dioxide to liberate additional hydrogen using the water-gas shift reaction 2:

$$CO + H_2O \rightarrow CO_2 + H_2. \quad \quad 2)$$

Thus, the overall reaction is shown in reaction 3:

$$CH_4 + 2H_2O \rightarrow CO_2 + 4H_2. \quad \quad 3)$$

The primary reformer portion of the reaction, where reaction 1 occurs, typically uses burners to drive the endothermic reaction. Reaction 1 typically occurs in catalyst-filled reaction tubes heated externally by the burners.

Two kinds of primary reformers are in use. A side-fired reactor uses a plurality of burners fired against a refractory wall. Each burner is configured to disburse its heat in substantial radial-symmetry along the plane of the wall. Two mutually parallel walls are so configured and enclose a bank of vertical catalyst-containing tubes through which the steam and methane are fed. The second kind of primary reformer is a down-fired reactor. A down-fired reactor has columns of catalyst tubes interleaved by vertically down-fired burners. In this design, alternating columns of tubes and burners allow for a more modular design that can be expanded to very large sizes. For this reason, the down-fired reactor may be preferred in modern installations.

Down-fired combustion suffers from several infirmities. The first is that the fired direction is contrary to the direction of natural buoyancy. Owing to particulars of the process, the fuel pressure may be relatively low and the fuel may include impurities from a pressure-swing adsorption system often used later in the process to purify the end product. Thus, the flames are fired against the buoyant direction with low momentum. If the combustion process is not finished before the fuel and air momentum are substantially exhausted, then the flame will bend and ultimately reverse direction. Inasmuch as the catalyst tubes are in close proximity to the burners, such bending leads to flame impingement on the catalyst tube. If the flame impinges on the catalyst tube, it will generate a carbonaceous deposit on the inside tube furnace known as coke. The effect of coke deposition is to insulate the tube from the process fluid. Since the process fluid cools the tube wall, coke deposits act to insulate the tube wall, and the tube may develop hot spots as localized overheating on the fired side of the tube.

In an effort to counter the normal buoyant force with greater momentum and to reduce the flame length and increase the speed of fuel burning, sometimes a high-pressure line of refinery gas is added to supplement the main combustion of low-pressure gas. However, this adds significant expense in that an additional and independent supply of fuel gas must be plumbed, controlled, and maintained. Moreover, even with a high-pressure fuel line, flame impingement can still be a problem. Coking can be removed from the inside of a tube using special methods referred to a "de-coking." However, the de-coking cycle can last days, during which the unit cannot produce hydrogen product.

What is needed is an effective method of flame control that does not exclusively rely on fuel momentum or require the complexity of adding high-pressure fuel gas.

SUMMARY

One embodiment includes a down-fired burner and/or down-fired flame reactor including a perforated flame holder and a down-fired fuel nozzle positioned above the perforated flame holder. The perforated flame holder includes an input surface facing the fuel nozzle, an output surface, and a plurality of perforations extending between the input and output surfaces. A heating mechanism is positioned adjacent the perforated flame holder.

In one embodiment the heating mechanism applies heat to the perforated flame holder before the fuel nozzle outputs fuel onto the perforated flame holder. After the heating mechanism heats the perforated flame holder, the down-fired fuel nozzle outputs fuel onto the perforated flame holder. The elevated temperature of the perforated flame holder causes a combustion reaction of the fuel within the perforations of the flame holder. The combustion reaction is confined primarily to the immediate vicinity of the perforated flame holder. More particularly, the combustion reaction is confined substantially within the perforations of the perforated flame holder.

In one embodiment the down-fired flame reactor includes a catalyst packed tube positioned adjacent the perforated flame holder. A reactant is passed through the tube. Heat from the combustion reaction radiates from the flame holder and heats the tube and/or hot combustion products from the combustion reaction convectively heat the tube, thereby causing the reactant to react with the catalyst. A reaction product is then passed from the tube.

DETAILED DESCRIPTION

Figure 1:
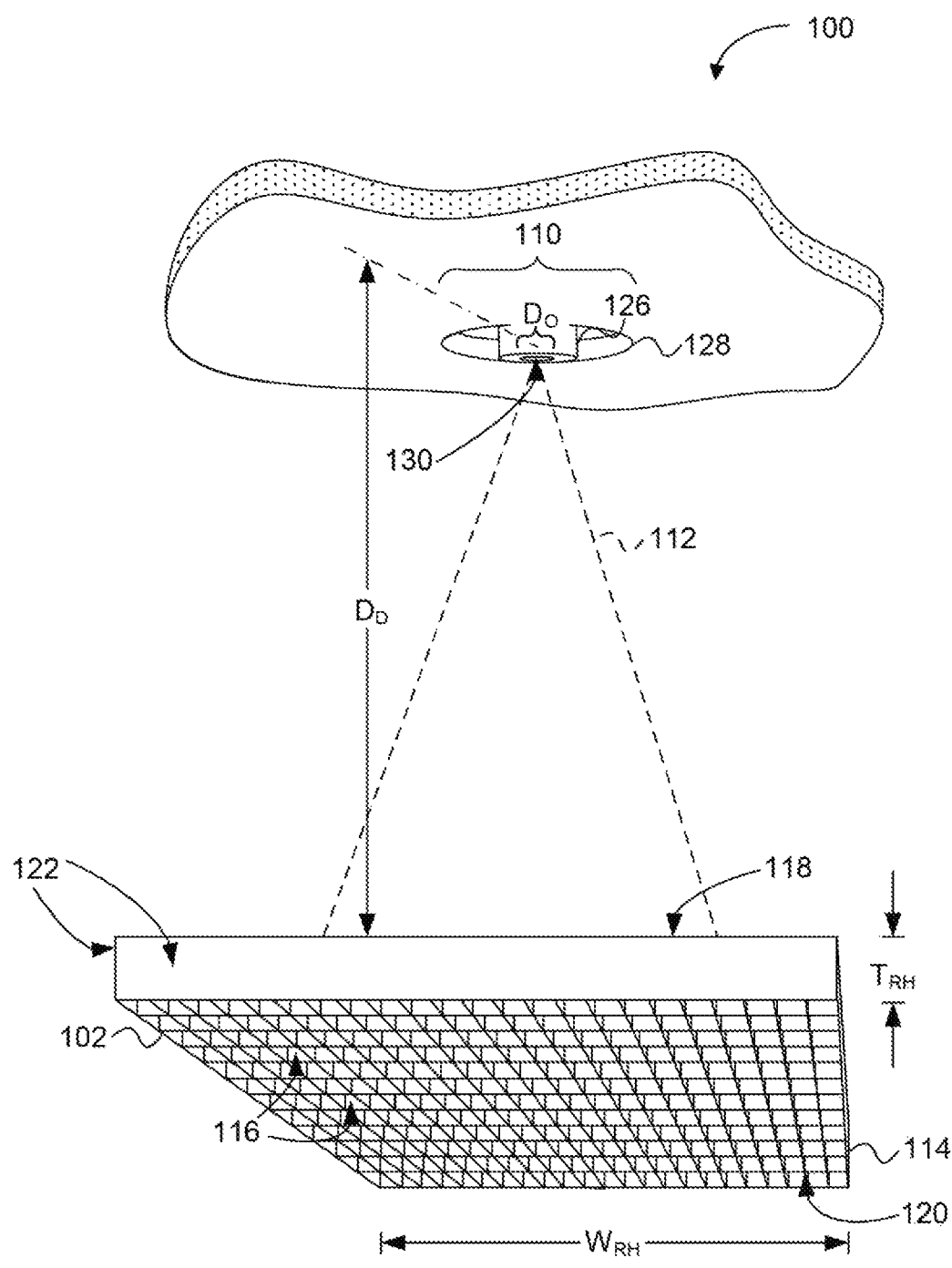
FIG. 1 is a perspective view of a down-fired burner system including a perforated flame holder, according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is a simplified perspective view of a down-fired burner system 100 including a perforated reaction holder 102, according to an embodiment. The down-fired burner system 100 includes a fuel and oxidant source 110 disposed to output fuel and oxidant into a combustion volume 108 to form a fuel and oxidant mixture 112. A perforated reaction holder 102 is disposed in the combustion volume 108. The perforated reaction holder 102 includes a perforated reaction holder body 114 defining a plurality of perforations 116 aligned to receive the fuel and oxidant mixture 112 from the fuel and oxidant source 110. The perforations 116 are configured to collectively hold a combustion reaction (e.g., see FIG. 2, 202) supported by the fuel and oxidant mixture 112.

The fuel can include a hydrocarbon gas or a vaporized hydrocarbon liquid, for example. The fuel can be a single species or can include a mixture of gases and vapors. For example in a process heater application, the fuel can include fuel gas or byproducts from the process that include carbon monoxide (CO), hydrogen ($H_2$), and methane ($CH_4$). In another application the fuel can include natural gas (mostly $CH_4$) or propane. In another application, the fuel can include #2 fuel oil or #6 fuel oil. Dual fuel applications and flexible fuel applications are similarly contemplated by the inventors. The oxidant can include oxygen carried by air and/or can include another oxidant, either pure or carried by a carrier gas.

Generally, the combustion reaction held by the perforated reaction holder 102 is indicative of a gas phase oxidation reaction. Other reactants and reactions may be substituted without departing from the spirit and scope of the disclosure.

According to an embodiment, the perforated reaction holder body 114 can be bounded by an input surface 118 disposed to receive the fuel and oxidant mixture 112, an output surface 120 facing away from the fuel and oxidant source 110, and a peripheral surface 122 defining a lateral extent of the perforated reaction holder 102. The plurality of perforations 116 defined by the perforated reaction holder body 114 extend from the input surface 118 to the output surface 120.

According to an embodiment, the perforated reaction holder 102 is configured to hold a majority of the combustion reaction within the perforations 116. For example, this means that more than half the molecules of fuel output into the combustion volume 108 by the fuel and oxidant source 110 are converted to combustion products between the input surface 118 and the output surface 120 of the perforated reaction holder 102. According to an alternative interpretation, this means that more than half of the heat output by the combustion reaction is output between the input surface 118 and the output surface 120 of the perforated reaction holder 102. Under nominal operating conditions, the perforations 116 can be configured to collectively hold at least 80% of the combustion reaction 202 (see FIG. 2) between the input surface 118 and the output surface 120 of the perforated reaction holder 102. In some experiments, the inventors produced a combustion reaction that was wholly contained in the perforations between the input surface 118 and the output surface 120 of the perforated reaction holder 102.

The perforated reaction holder 102 can be configured to receive heat from the combustion reaction 202 and output a portion of the received heat as thermal radiation 206 (see FIG. 2) to heat-receiving structures (e.g., furnace walls and/or radiant section working fluid tubes (see. FIG. 3)) in or adjacent to the combustion volume 108. The perforated reaction holder 102 outputs another portion of the received heat to the fuel and oxidant mixture 112 received at the input surface 118 of the perforated reaction holder 102.

In this way, the perforated reaction holder 102 acts as a heat source to maintain the combustion reaction, optionally, even under conditions where a combustion reaction would not be stable when supported from a conventional flame holder. This capability can be leveraged to support combustion using a leaner fuel to oxidant mixture than was previously feasible. Leaner combustion results in lower peak combustion temperature and reduces oxides of nitrogen (NOx) output. Moreover, the perforated reaction holder 102 may act as a heat sink to cool hotter parts of the reaction to further minimize combustion temperature. Finally, substantial containment of the combustion reaction between the input surface 118 and the output surface 120 of the perforated reaction holder 102 limits the time during which the combustion fluid (including molecular nitrogen, $N_2$, if the oxidant includes oxygen carried by air) is exposed to high temperature. The inventors believe this further limits NOx output.

Cooled flue gas is vented to the atmosphere through an exhaust flue. Optionally, the vented flue gas can pass through an economizer that pre-heats the combustion air, the fuel, and/or feed water.

The perforated reaction holder 102 can have a width dimension $W_{RH}$ between opposite sides of the peripheral surface 122 at least twice a thickness dimension $T_{RH}$ between the input surface 118 and the output surface 120. In another embodiment, the perforated reaction holder 102 can have a width dimension $W_{RH}$ between opposite sides of the peripheral surface 122 at least three times a thickness dimension $T_{RH}$ between the input surface 118 and the output surface 120. In another embodiment, the perforated reaction holder 102 has a width dimension $W_{RH}$ between opposite sides of the peripheral surface 122 at least six times a thickness dimension $T_{RH}$ between the input surface 118 and the output surface 120. In another embodiment, the perforated reaction holder 102 has a width dimension $W_{RH}$ between opposite sides of the peripheral surface 122 at least nine times a thickness dimension $T_{RH}$ between the input surface 118 and the output surface 120.

In an embodiment, the perforated reaction holder 102 can have a width dimension $W_{RH}$ less than a width W of the combustion volume 108. This can allow circulation of flue gas from above to below the perforated reaction holder 102.

The perforated reaction holder 102 can be formed from a refractory material. In another embodiment, the perforated reaction holder 102 can be formed from an aluminum silicate material. In another embodiment, the perforated reaction holder 102 can be formed from mullite or cordierite.

The fuel and oxidant source 110 can further include a fuel nozzle 126 configured to output fuel and an oxidant source 128 configured to output a fluid including the oxidant. The fuel nozzle 126 can be configured to output pure fuel. The oxidant source 128 can be configured to output fluid including the oxidant that includes no fuel. For example, the oxidant source 128 can be configured to output air carrying oxygen.

The fuel nozzle 126 can be configured to emit a fuel jet selected to entrain the oxidant to form the fuel and oxidant mixture 112 as the fuel jet and oxidant travel through a dilution distance $D_D$ between the fuel nozzle 126 and the perforated reaction holder 102. Additionally or alternatively, the fuel nozzle 126 can be configured to emit a fuel jet selected to entrain the oxidant and to entrain flue gas as the fuel jet travels through a dilution distance $D_D$ between the fuel nozzle 126 and an input surface 118 of the perforated reaction holder 102.

The perforated reaction holder 102 can be disposed a distance $D_D$ away from the fuel nozzle. The fuel nozzle 126 can be configured to emit the fuel through a fuel orifice 130 having a dimension $D_O$. The perforated reaction holder 102 can be disposed to receive the fuel and oxidant mixture 112 at a distance $D_D$ away from the fuel nozzle greater than 20 times the fuel orifice 130 dimension $D_O$. In another embodiment, the perforated reaction holder 102 is disposed to receive the fuel and oxidant mixture 112 at a distance $D_D$ away from the fuel nozzle 126 greater than or equal to 100 times the fuel orifice dimension $D_O$. In another embodiment the perforated reaction holder 102 can be disposed to receive the fuel and oxidant mixture 112 at a distance $D_D$ away from the fuel nozzle 126 equal to about 245 times the fuel orifice dimension $D_O$.

The perforated reaction holder 102 can include a single perforated reaction holder body 114. In another embodiment, the perforated reaction holder 102 can include a plurality of adjacent perforated reaction holder sections. The plurality of adjacent perforated reaction holder bodies 114 can provide a tiled perforated reaction holder 102.

The perforated reaction holder 102 can further include a perforated reaction holder tile support structure configured to support the plurality of perforated reaction holder sections. The perforated reaction holder tile support structure can include a metal superalloy. In another embodiment, the plurality of adjacent perforated reaction holder sections can be joined with a fiber reinforced refractory cement.

Figure 2:
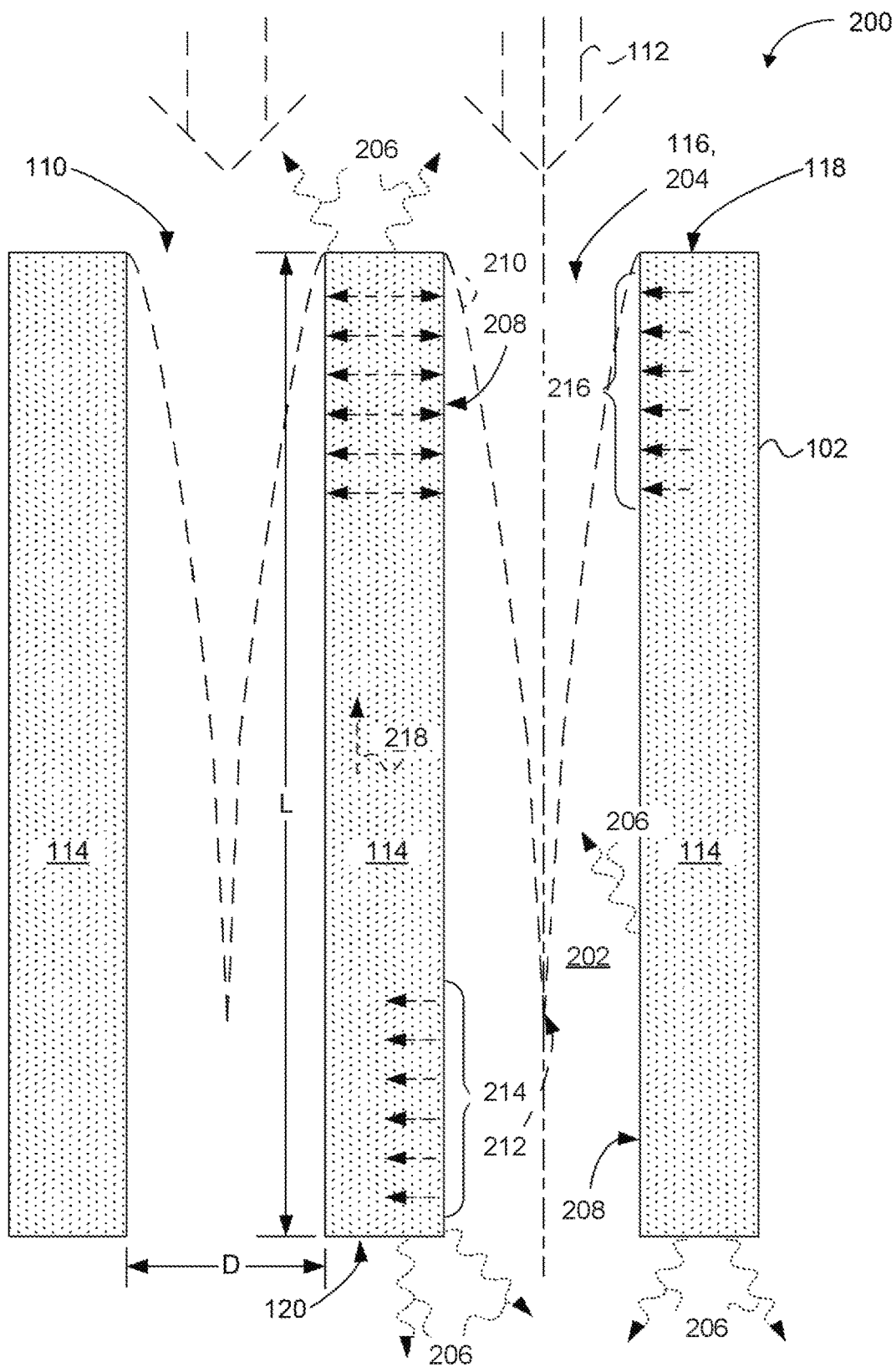
FIG. 2 is a cross sectional view of the down-fired burner system of FIG. 1, according to one embodiment.
Figure 3:
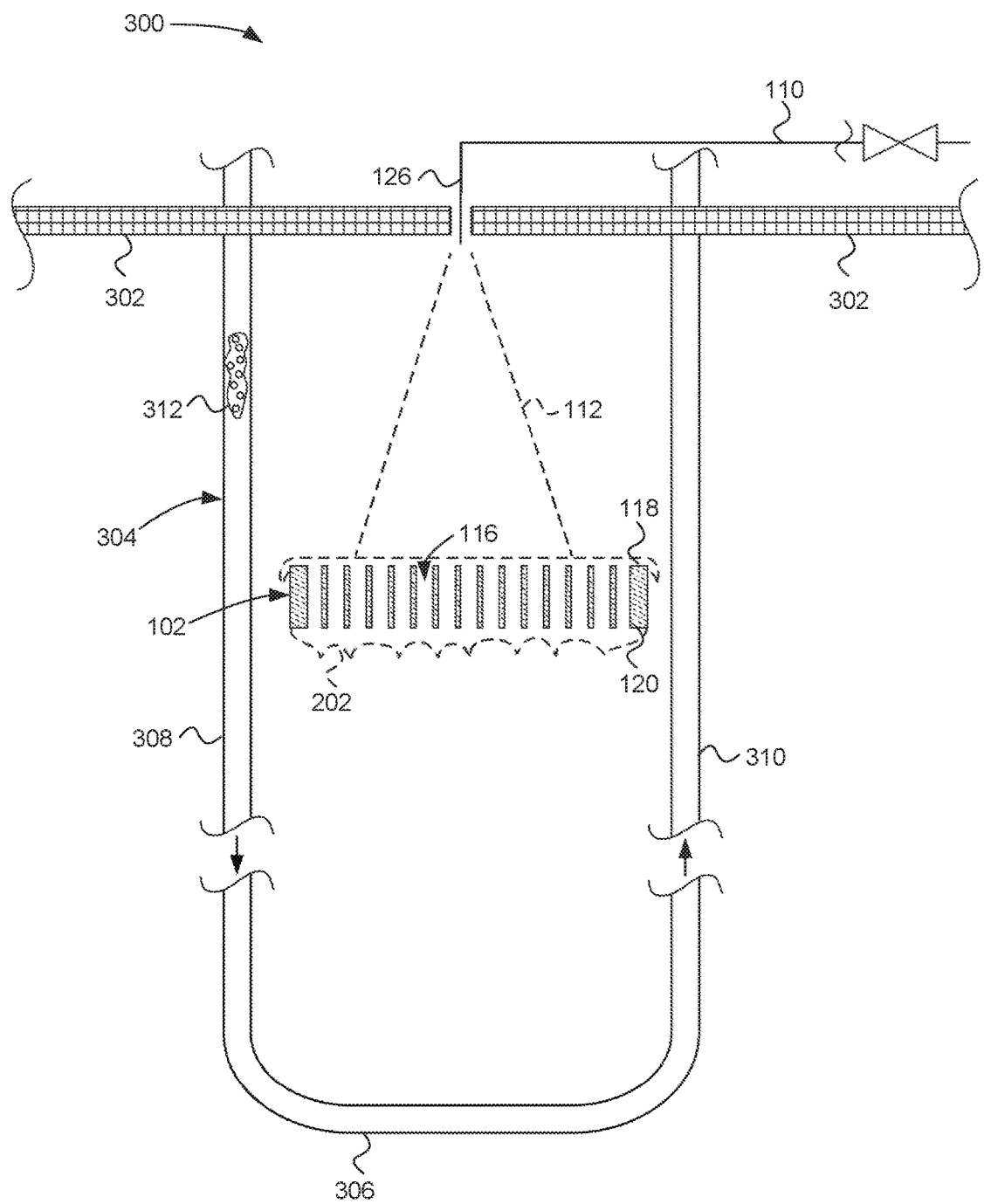
FIG. 3 is a diagram of down-fired burner system including a perforated flame holder, according to one embodiment.

FIG. 2 is side sectional diagram of a portion of the perforated reaction holder 102 of FIG. 1, according to an embodiment 200. In the embodiment 200 of FIG. 2, the perforated reaction holder body 114 is continuous. That is, the body 114 is formed from a single piece of material. The embodiment 200 of FIG. 2 also illustrates perforations 116 that are non-branching. That is, the perforated reaction holder body 114 defines perforations 116 that are separated from one another such that no flow crosses between perforations.

In an alternative embodiment the perforated reaction holder body 114 defines perforations that are non-normal to the input and output surfaces 118, 120. While this arrangement has an effect on gas trajectory exiting the output surface 120, the perforations operate similarly to those described in conjunction with FIG. 2.

Referring now to FIG. 2, the perforated reaction holder body 114 defines a plurality of perforations 116 configured to convey the fuel and oxidant and to hold the combustion reaction 202 supported by the fuel and oxidant. The body is configured to receive heat from the combustion reaction 202, hold the heat, and output the heat to the fuel and oxidant entering the perforations 116. The perforations 116 can maintain a combustion reaction 202 of a leaner mixture of fuel and oxidant 112 than is maintained outside of the perforations 116.

The perforated reaction holder 102 has an extent defined by an input surface 118 facing the fuel and oxidant source 110 and an output surface 120 facing away from the fuel and oxidant source 110. The perforated reaction holder body 114 defines a plurality of perforations 116 that can be formed as a plurality of elongated apertures 204 extending from the input surface 118 to the output surface 120.

The perforated reaction holder 102 receives heat from the combustion reaction 202 and outputs sufficient heat to the fuel and oxidant mixture 112 to maintain the combustion reaction 202 in the perforations 116. The perforated reaction holder 102 can also output a portion of the received heat as thermal radiation 206 to combustor walls of the combustion volume 108 (see FIG. 1). Each of the perforations 116 can bound a respective finite portion of the fuel combustion reaction 202.

In an embodiment, the plurality of perforations 116 are each characterized by a length L defined as a reaction fluid propagation path length between an input surface 118 and an output surface 120 of the perforated reaction holder 102. The reaction fluid includes the fuel and oxidant mixture 112 (optionally including air, flue gas, and/or other "non-reactive" species, reaction intermediates (including transition states that characterize the combustion reaction), and reaction products.

The plurality of perforations 116 can be each characterized by a transverse dimension D between opposing perforation walls 208. The length L of each perforation 116 can be at least eight times the transverse dimension D of the perforation. In another embodiment, the length L can be at least twelve times the transverse dimension D. In another embodiment, the length L can be at least sixteen times the transverse dimension D. In another embodiment, the length L can be at least twenty-four times the transverse dimension D. The length L can be sufficiently long for thermal boundary layers 210 formed adjacent to the perforation walls 208 in a reaction fluid flowing through the perforations 116 to converge within the perforations 116, for example.

According to an embodiment, the perforated reaction holder 102 can be configured to cause the fuel combustion reaction 202 to occur within thermal boundary layers 210 formed adjacent to perforation walls 208 of the perforations 116. As relatively cool fuel and oxidant 112 approach the input surface 118, the flow is split into portions that respectively travel through individual perforations 116. The hot perforated reaction holder body 114 transfers heat to the fluid, notably within thermal boundary layer 210 that progressively thicken as more and more heat is transferred to the incoming fuel and oxidant 112. After reaching a combustion temperature, the reactants flow while a chemical ignition delay time elapses, after which the combustion reaction 202 occurs. Accordingly, the combustion reaction 202 is shown as occurring within the thermal boundary layers 210. As flow progresses, the thermal boundary layers merge at a point 212. Ideally, the point 212 lies between the input surface 118 and output surface 120. At some point, the combustion reaction 202 causes the flowing gas (and plasma) to output more heat than it receives from the body 114. The received heat from a region 214 is carried to a region nearer to the input surface 120, where the heat recycles into the cool reactants.

The perforations 116 can include elongated squares, each of the elongated squares has a transverse dimension D between opposing sides of the squares. In another embodiment, the perforations 116 can include elongated hexagons, each of the elongated hexagons has a transverse dimension D between opposing sides of the hexagons. In another embodiment, the perforations 116 can include hollow cylinders, each of the hollow cylinders has a transverse dimension D corresponding to a diameter of the cylinders. In another embodiment, the perforations 116 can include truncated cones, each of the truncated cones has a transverse dimension D that is rotationally symmetrical about a length axis that extends from the input surface 118 to the output surface 120. The perforations 116 can each have a lateral dimension D equal to or greater than a quenching distance of the fuel.

In one range of embodiments, the plurality of perforations have a lateral dimension D between 0.05 inch and 1.0 inch. Preferably, the plurality of perforations have a lateral dimension D between 0.1 inch and 0.5 inch. For example the plurality of perforations 116 can have a lateral dimension D of about 0.2 to 0.4 inch.

The perforated reaction holder body 114 can include a refractory material. The perforated reaction holder body 114 can include a metal superalloy, for example, or the perforated reaction holder body can be formed from a refractory material such as cordierite or mullite, for example. The perforated reaction holder body 114 can define a honeycomb.

The perforations 116 can be parallel to one another and normal to the input and output surfaces 118, 120. In another embodiment, the perforations 116 can be parallel to one another and formed at an angle relative to the input and output surfaces 118, 120. In another embodiment, the perforations 116 can be non-parallel to one another. In another embodiment, the perforations 116 can be non-parallel to one another and non-intersecting.

Referring still to FIG. 2, the perforated reaction holder body 114 defining the perforations 116 can be configured to receive heat from the (exothermic) combustion reaction 202 at least in second regions 214 of perforation walls 208. (e.g., near the output surface 120 of the perforated reaction holder 102). The perforated reaction holder body 114 defining the perforations 116 can be characterized by a heat capacity. The perforated reaction holder body 114 can be configured to hold heat from the combustion fuel reaction in an amount corresponding to the heat capacity.

The perforated reaction holder body 114 can be configured to transfer heat from the heat receiving regions 214 to heat output regions 216 of the perforation walls 208. (e.g., wherein the heat output regions 216 are near the input surface 118 of the perforated reaction holder 102). For example, the perforated reaction holder body 114 can be configured to transfer heat from the heat receiving regions 214 to the heat-output regions 216 of the perforation walls 208 via thermal radiation 206. Additionally or alternatively, the body 114 can be configured to transfer heat from the heat-receiving regions 214 to the heat-output regions 216 of the perforation walls 208 via a heat conduction path 218.

In another embodiment, the perforated reaction holder body 114 can be configured to transfer heat to a working fluid. The working fluid can be configured to transfer heat from a portion of the body near the heat-receiving regions 214 of the perforation walls 208 to a portion of the body 114 near the heat-output regions 216 of the perforation walls 208.

The perforated reaction holder body 114 can be configured to output heat to the boundary layers 210 at least in heat-output regions 216 of perforation walls 208 (e.g., near the input surface 118 of the perforated reaction holder 102). Additionally or alternatively, the body 114 can be configured to output heat to the fuel and oxidant mixture 112 at least in heat-output regions 216 of perforation walls 208 (e.g., near the input surface 118 of the perforated reaction holder 102). wherein the perforated reaction holder body 114 is configured to convey heat between adjacent perforations 116. The heat conveyed between adjacent perforations can be selected to cause heat output from the combustion reaction portion 202 in a perforation 116 to supply heat to stabilize a combustion reaction portion 202 in an adjacent perforation 116.

The perforated reaction holder body 114 can be configured to receive heat from the fuel combustion reaction 202 and output thermal radiated heat energy 206 to maintain a temperature of the perforated reaction holder body 114 below an adiabatic flame temperature of the fuel combustion reaction 202. Additionally or alternatively, the body can be configured to receive heat from the fuel combustion reaction 202 to cool the fuel combustion reaction 202 to a temperature below a NOx formation temperature.

The plurality of perforations 116 can include a plurality of elongated squares. In another embodiment, the plurality of perforations 116 can include a plurality of elongated hexagons.

Honeycomb shapes used in the perforated reaction holder 102 can be formed from VERSAGRID® ceramic honeycomb, available from Applied Ceramics, Inc. of Doraville, S.C.

As described above, FIG. 2 illustrates an embodiment 200 wherein the perforated reaction holder body 114 is continuous. A continuous reaction holder body 114 is, within any one section, a single piece that is extruded, drilled, or otherwise formed to define the plurality of perforations 116. However, in one embodiment the perforated reaction holder body 114 is discontinuous. A discontinuous reaction holder body 114 is formed from a plurality of pieces of material. In the embodiment 201 (not shown), the plurality of pieces of material comprise planar pieces that are stacked to form the reaction holder body. The embodiments 200 and 201 operate substantially identically in that the individual stacked pieces are intimately contacting and form perforations 116 that are separated from one another.

FIG. 3 is a simplified illustration of a down-fired flame reactor 300 according to one embodiment. The down-fired flame reactor 300 includes a fuel and oxidant source 110 coupled to a down-fired fuel nozzle 126. A perforated flame holder 102 is positioned below the down-fired fuel nozzle 126. A catalyst packed tube 304 extends from the ceiling 302 on both sides of and below the perforated flame holder 102.

The down-fired fuel nozzle 126 emits one or more pressurized fuel jets downwardly, in a direction substantially in opposition to flame buoyancy. The fuel contacts the flame holder 102, which in one embodiment has been preheated, and a combustion reaction 202 of the fuel is initiated within the perforated flame holder as described previously.

In one embodiment, the fuel nozzle 126 protrudes much further into the heating volume, closer to perforated flame holder 102, in order to maintain momentum of the fuel stream 112. While the fuel nozzle 126 is not illustrated with particular detail in FIG. 3, those of skill the art will understand that many configurations of the fuel nozzle 126 are possible in light of principles of the present disclosure. All such other configurations fall within the scope of the present disclosure. For example, the fuel nozzle 126 can include multiple individual apertures. A plurality of the apertures can output fuel while another plurality of the apertures can output oxygen or a gas containing oxygen, such as air. Thus the fuel stream 112 illustrated in FIG. 3 includes a mixture of oxygen and fuel.

In one embodiment 50% or more of the combustion reaction of the fuel is contained within perforations 116 of the flame holder 102. Alternatively, 80% or more of the combustion reaction 202 can be contained within the perforations 116 of the flame holder 102.

Because the combustion reaction 202 is substantially confined to the perforated flame holder 102, direct impingement of the flame on the catalyst-packed tube 304 is reduced or avoided entirely. This confinement of the combustion reaction 202 reduces or eliminates coking and hot spots on the catalyst-packed tubes 102 and may allow an extended maintenance schedule.

While the combustion reaction occurs within the flame holder 102, heated gases, the products of the combustion reaction 202 within the apertures 116 of the flame holder 102, are expelled from the apertures 116 via the output surface 120 of the flame holder 102. The momentum of these gases carries them downward for some distance below the flame holder 102. This downward momentum of the heated gases carries them closer to the bottom portion 306 of the tube 304 and can further heat the bottom portion 306 of the tube 304. As the momentum of the gases decreases, buoyancy causes the heated gases to rise. As the heated gases rise along the tube 304, further heat is provided to the tube 304 without direct impingement by the very hottest portions of a flame.

According to one embodiment, the tubes 304, back to the catalyst 312, are arranged in flow-coupled pairs via a tube fitting or bend (bottom portion) 306 at lower ends of each flow-coupled pair. Each flow-coupled pair is configured to receive reactants through an input end 308 and output reaction products through an output end 310 near the ceiling 302 of the heating volume. The reactants react with the catalyst 312 when heated by the combustion reaction 202 that occurs in the perforated flame holder 102. The direction of flow of the reactants and reaction products is indicated by the downward pointing arrow in the vertical section (input end) 308 of the tube 304 and the upward arrow in the vertical section (output end) 310 of the tube 304.

While the perforated flame holder 102 is positioned slightly less than halfway between the ceiling and the bottom portion 306, those skilled in the art will understand, in light of the present disclosure, that the perforated flame holder 102 can be positioned in various configurations with respect to the nozzle 126 and the tube 304. Changes in position of the flame holder 102 can be accompanied by changes in fuel momentum to ensure that the combustion reaction 202 occurs within the flame holder 102. All such other configurations fall within the scope of the present disclosure.

Figure 4:
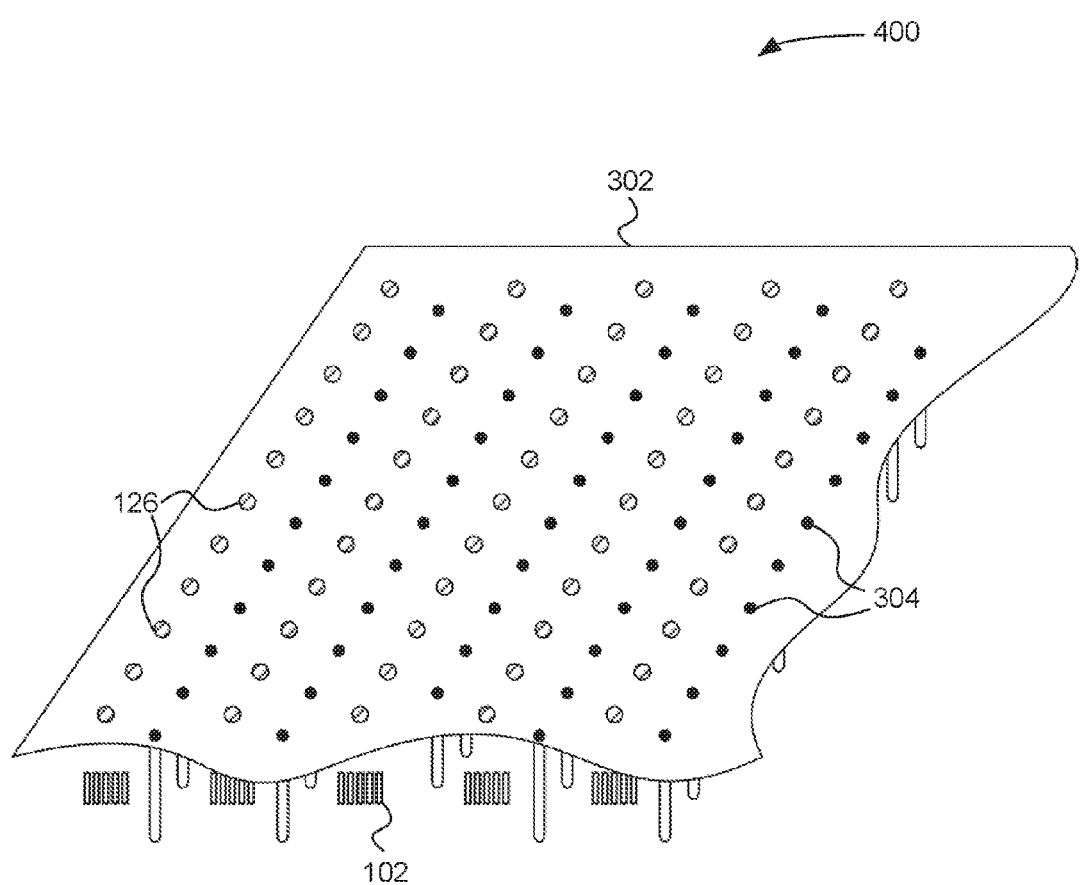
FIG. 4 is a perspective view of multiple down-fired flame reactors, according to another embodiment.

FIG. 4 is a perspective view of multiple down-fired flame reactors 400, according to another embodiment. The multiple down-fired flame reactors 400 are inserted into a furnace volume from a furnace ceiling 302. The furnace ceiling 302 includes refractory tile, according to an embodiment. A perspective perforated flame holder 102 is positioned below each down-fired fuel nozzle 126. The down-fired fuel nozzles 126 and catalyst tubes 304 can be arrayed in a checkerboard pattern, wherein each down-fired fuel nozzle 126 and perforated flame holder 102, and wherein each catalyst tube 304 is heated by four adjacent perforated flame holders 102.

Figure 5:
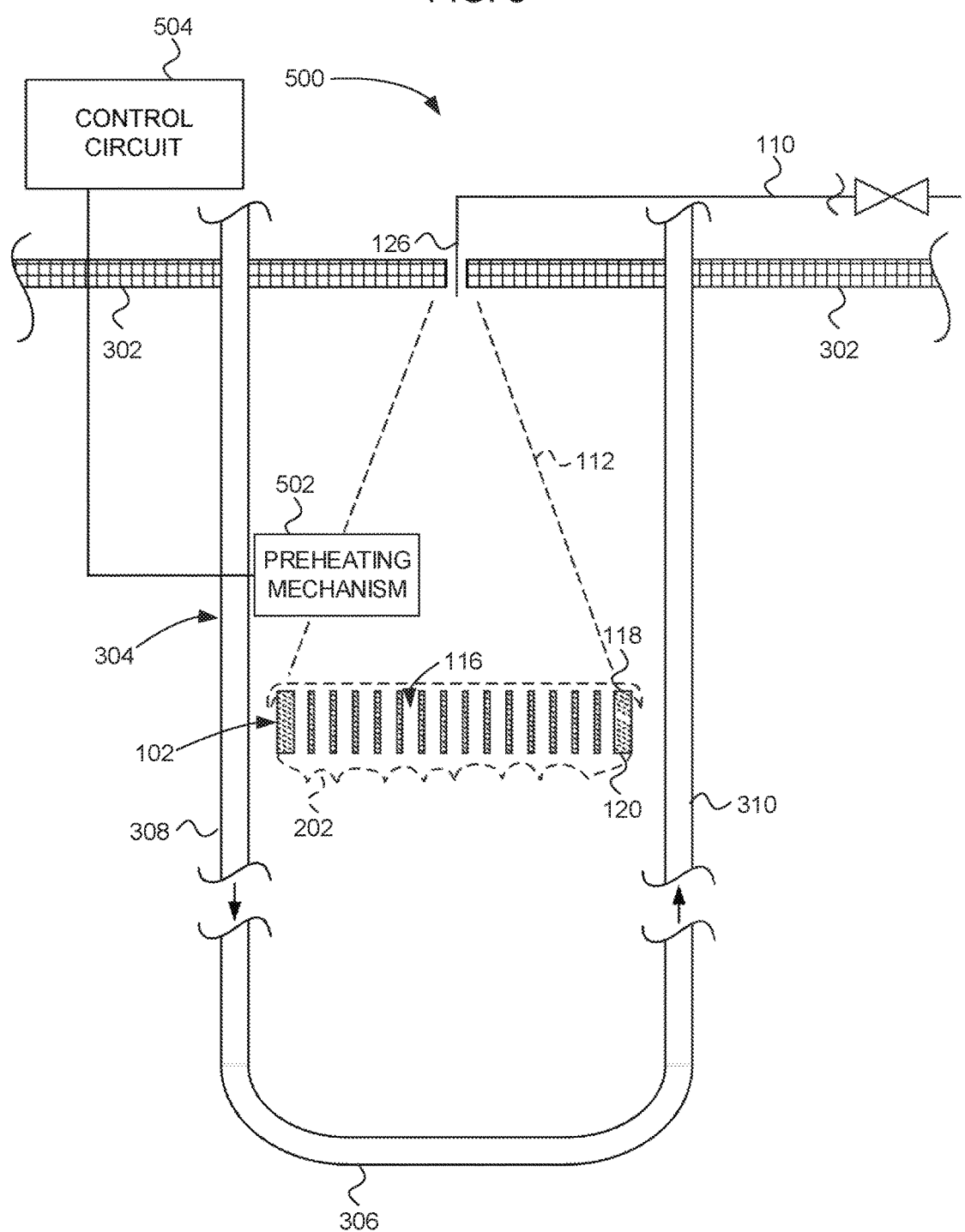
FIG. 5 is a block diagram of a down-fired burner system including a perforated flame holder and a preheating mechanism, according to one embodiment.

FIG. 5 is a block diagram of a down-fired burner 500, according to one embodiment. The down-fired burner of FIG. 5 is substantially similar to the down-fired burner 300 of FIG. 3. The embodiment of FIG. 5 further includes a preheating mechanism 502 positioned adjacent the perforated flame holder 102. The preheating mechanism 502 is electrically coupled to a control circuit 504.

The preheating mechanism 502 is configured to preheat the perforated flame holder 102 prior to outputting fuel from the nozzle 126 onto the perforated flame holder 102. In particular, in preparation for initiating a combustion reaction 202 of the fuel stream 112 in the perforated flame holder 102, the fuel stream 112 is appreciated to a threshold temperature. The threshold temperature selected such that when the perforated flame holder 102 is heated to a threshold temperature, the combustion reaction 202 of the fuel spontaneously begins when the fuel stream 112 contacts perforated flame holder 102. More particularly, the threshold temperature is an auto-ignition temperature of the fuel plus an additional temperature elevation selected to prevent initial cooling by cool fuel and combustion air impinging on the perforated flame holder 102 from lowering the temperature of the perforated flame holder 102 to a temperature below the auto-ignition temperature.

Heat from the combustion reaction 202 further increases the temperature of the flame holder 102. In this manner a self-sustaining combustion reaction 202 can be initiated by merely preheating the flame holder 102 to a threshold temperature and then outputting the fuel stream 112 onto the flame holder 102.

According to one embodiment, the preheating mechanism 502 includes an electrical resistor coupled to the perforated flame holder 102. Heat is generated by passing a current through the resistor. Because the perforated flame holder 102 is in contact with the resistor, the perforated flame holder 102 heats up while the current is passed through the resistor.

Figure 6:
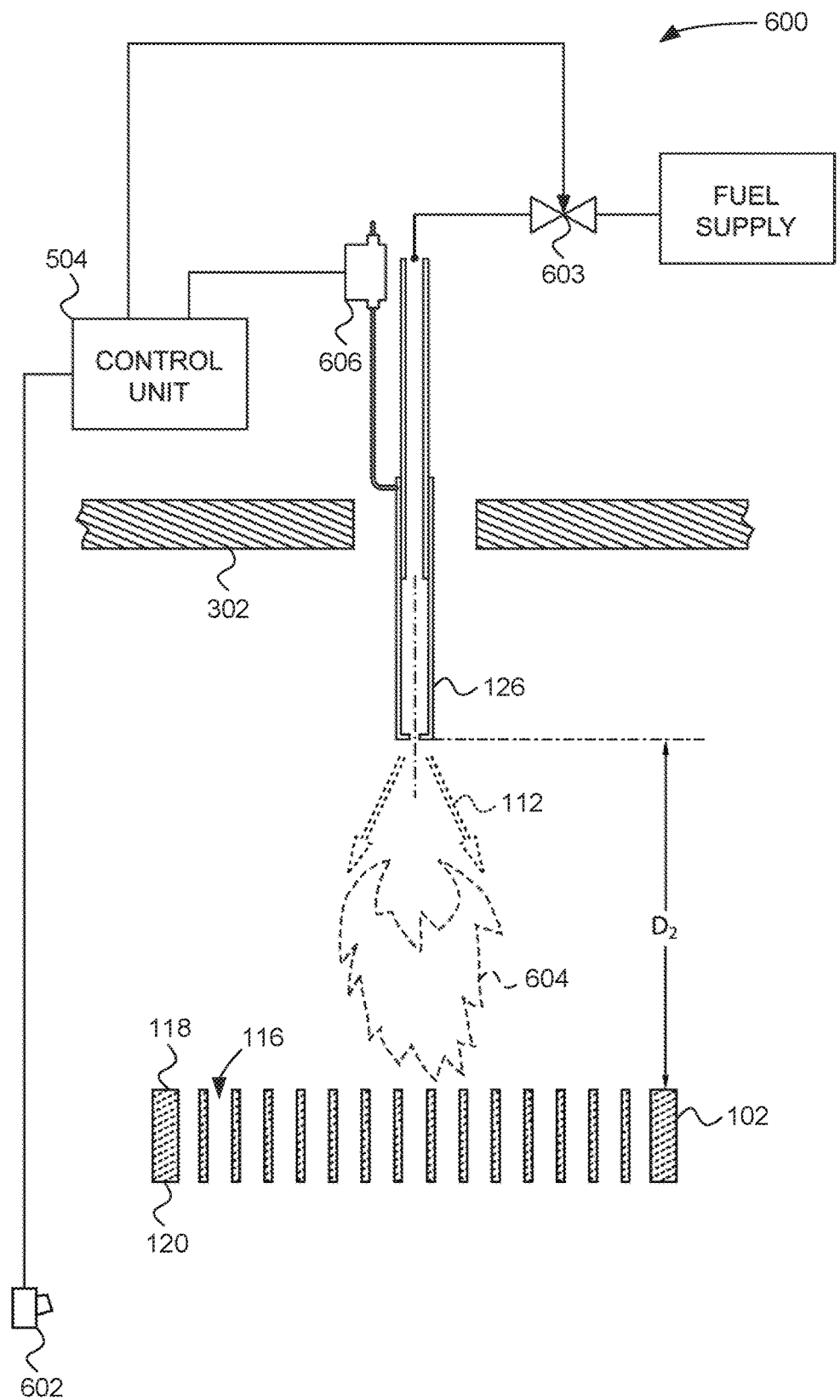
FIG. 6 is an illustration of a down-fired burner system including a perforated flame holder and a preheating mechanism, according to one embodiment.

FIG. 6 is a block diagram of a down-fired burner 600 including a preheating mechanism 502, according to one embodiment. The preheating mechanism 502 is coupled to an adjustable fuel nozzle 126. A temperature sensor 602 is positioned adjacent the flame holder 102.

FIG. 6 shows the down-fired burner 600 in startup mode, in which the fuel nozzle 126 is it is extended, i.e., startup position, in which the distance $D_2$ between the nozzle 126 and the flame holder 102 is significantly reduced as compared to when the nozzle is fully retracted. Additionally, the control circuit 504 controls a fuel control valve 603 to reduce the volume and velocity of the fuel stream 112 ejected by the nozzle 126. Because the velocity of the fuel stream 112 is reduced, a stable startup flame 604 can be supported by the nozzle 126, alone, in a position between the nozzle and the flame holder 102. By moving the nozzle 126 to the extended position, the startup flame 604 is positioned close to the flame holder 102, and is thus able to quickly heat a portion of the flame holder 102 to a temperature that exceeds a threshold defining a minimum startup temperature (i.e., the startup temperature threshold) of the flame holder 102. When the signal from the temperature sensor 602 indicates that the temperature of the flame holder 102 is above the threshold, the system control unit 504 controls the nozzle position controller 606 to move the nozzle 126 to the retracted, operational position, and controls the fuel control valve 603 to open further, increasing the fuel flow to an operational level. As the velocity of the fuel stream 112 increases, the startup flame 604 is blown out. As the uncombusted fuel mixture reaches the flame holder 102, the mixture auto-ignites, at least within the portion of the flame holder 102 that has been heated beyond the startup threshold. Very quickly thereafter, the entire flame holder 102 is heated to its operating temperature, and continues in normal operation thereafter.

According to another embodiment, the system control unit 504 includes a timer by which transition from startup mode to operational mode is controlled; i.e., when startup is initiated, the system control unit 504 starts the timer, and when a selected time period has passed, the nozzle 126 is retracted and the fuel flow is increased, as described above. The time period is selected according to a predetermined period necessary to ensure that the flame holder 102 has reached the startup temperature threshold.

The movable nozzle 126 can also be employed in combustion systems that may be required to operate on a variety of fuels. As is well known in the art, the fuel-to-air ratio at which the mixture is combustible varies according to the type of fuel, as does flame propagation speed within a flow of fuel. Thus, an optimal operating distance $D_2$ will vary according to the type of fuel. The down-fired burner 600 can accommodate changes in fuel type by adjustment of the position of the nozzle 126 relative to the flame holder 102. The adjustment can be made by direct manual control of the nozzle 126, or the system control unit 504 can be programmed to make the adjustment automatically. For example, additional sensors can be positioned to detect emission levels of flames propagating within the fuel stream 112, incomplete combustion, etc., in response to which the system control unit can be programmed to modify the position of the nozzle 126 and/or the fuel flow by adjustment of the fuel control valve 603, to bring the operation of the system closer to an optimum or desired level.

Figure 7:
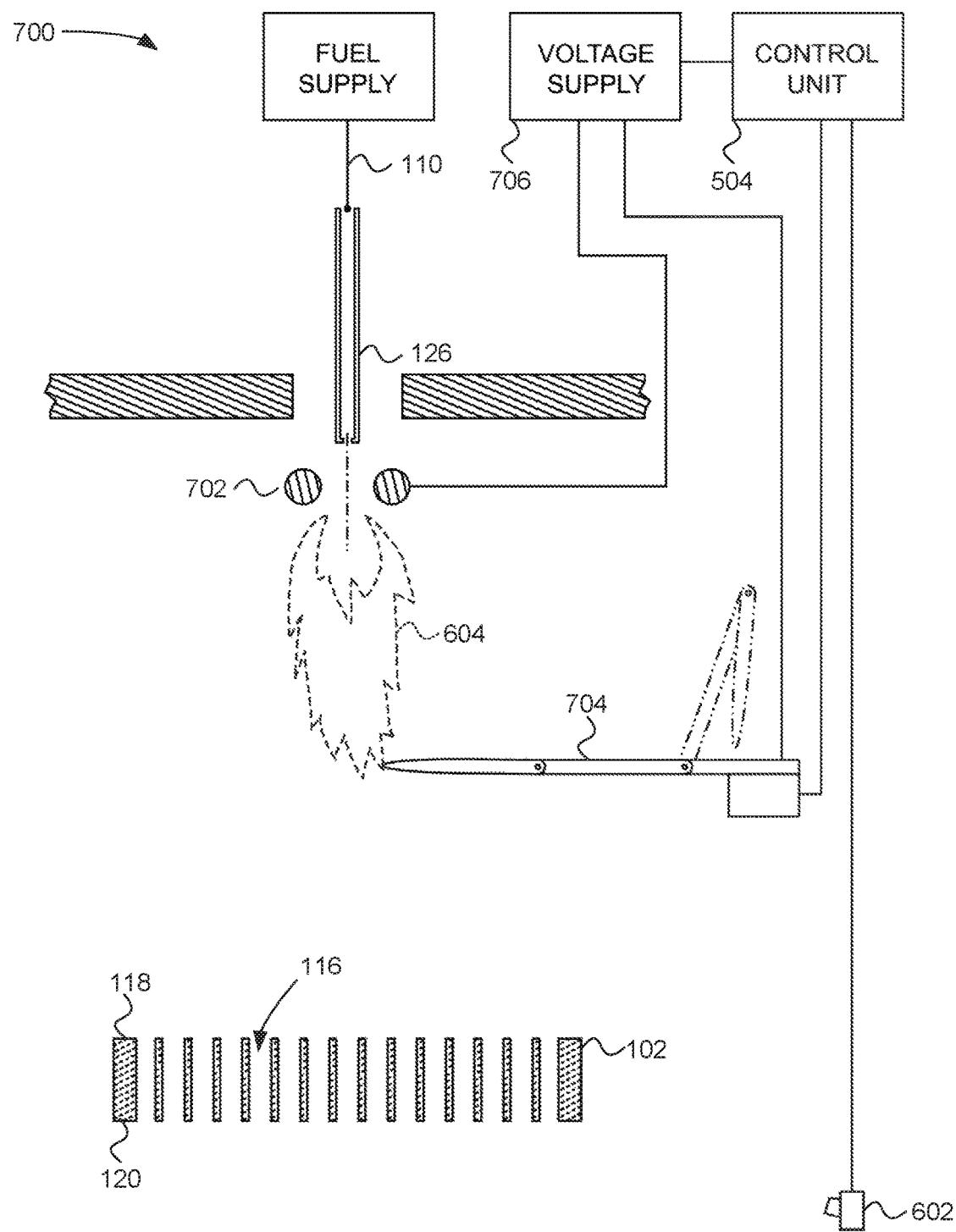
FIG. 7 is an illustration of a down-fired burner system including a perforated flame holder and a preheating mechanism, according to one embodiment.

FIG. 7 is a diagrammatical side view of a down-fired burner 700, according to an embodiment, portions of which are shown in section. The combustion system includes a first electrode 702 and second electrode 704 (which functions as a preheating mechanism), both operatively coupled to a voltage supply 706. A control unit 504 is coupled to the voltage supply 706 and a temperature sensor 602.

The first electrode 702 is in a toric shape such as a torus, positioned just downstream of the nozzle 126 and centered on the longitudinal axis A of the nozzle so that the fuel stream 112 passes through the first electrode 702. The second electrode 704 is positioned between the input end 118 of the flame holder 102 and the nozzle 126. The second electrode 704 is movable from an extended position, as shown in solid lines in FIG. 7, to a retracted position, shown in phantom lines. The control unit 504 is configured to extend and retract the second electrode 704. In the extended position, the second electrode 704 extends to a position close to or intersecting the longitudinal axis A. In the retracted position, the second electrode 704 is spaced away from contact with the fuel stream 112 or a flame supported thereby. According to an embodiment, a temperature sensor 602 is provided, as previously described.

In operation, when the combustion system 700 is in startup mode, i.e., when startup is initiated, the control unit 504 controls the electrode position control 708 to move the second electrode 704 to the extended position. The control unit 504 controls the voltage supply 706 to transmit a first voltage signal to the first electrode 702. As the fuel stream 112 passes through the first electrode 702, an electrical charge having a first polarity is imparted to the fuel stream. Meanwhile, the control unit 504 transmits a second voltage signal from the voltage supply 706 to the second electrode 704. The second voltage signal has a polarity that is opposite that of the charge imparted to the fuel stream, and therefore attracts the oppositely-charged fuel stream. Ignition is initiated within the fuel stream 112, whereupon a startup flame 604 is held between the first and second electrodes 702, 704, in spite of the high velocity of the fuel stream. This method of holding a flame within a fuel flow is sometimes referred to as electrodynamic combustion control.

According to an embodiment, the control unit 504 controls the voltage supply 706 to apply a voltage signal to the second electrode 704 while connecting the first electrode 702 to ground. According to an embodiment, the voltage signal applied to the first and/or second electrode is an AC signal.

With the startup flame 604 held below the input surface 118 of the flame holder 102, a portion of the flame holder 102 is quickly heated to the startup temperature threshold. When the startup temperature threshold is surpassed, the control unit 504 controls the voltage supply 706 to remove the voltage signals from the first and second electrodes 702, 704, and controls the electrode position controller 708 to move the second electrode 704 to the retracted position. When the voltage signals are removed from the electrodes, the startup flame 604 is no longer held, and blows out. As previously described, when the uncombusted fuel and air mixture reaches the flame holder 102, the primary flame auto-ignites in the preheated portions of the flame holder 102, and normal operation quickly follows.

Although embodiments are described as including a system control unit that is configured to control transition between a startup mode and an operational mode, alternative embodiments are operated manually. For example, according to an embodiment, the down-fired burner 700 is configured such that an operator manually switches the electrode position controller to move the second electrode 704. According to another embodiment, the operator manually extends and retracts the second electrode 704. Additionally, according to an embodiment, an operator manually switches a voltage signal to the first and second electrodes 702, 704, and switches the signals off when the flame holder 102 exceeds the startup threshold.

Figure 8:
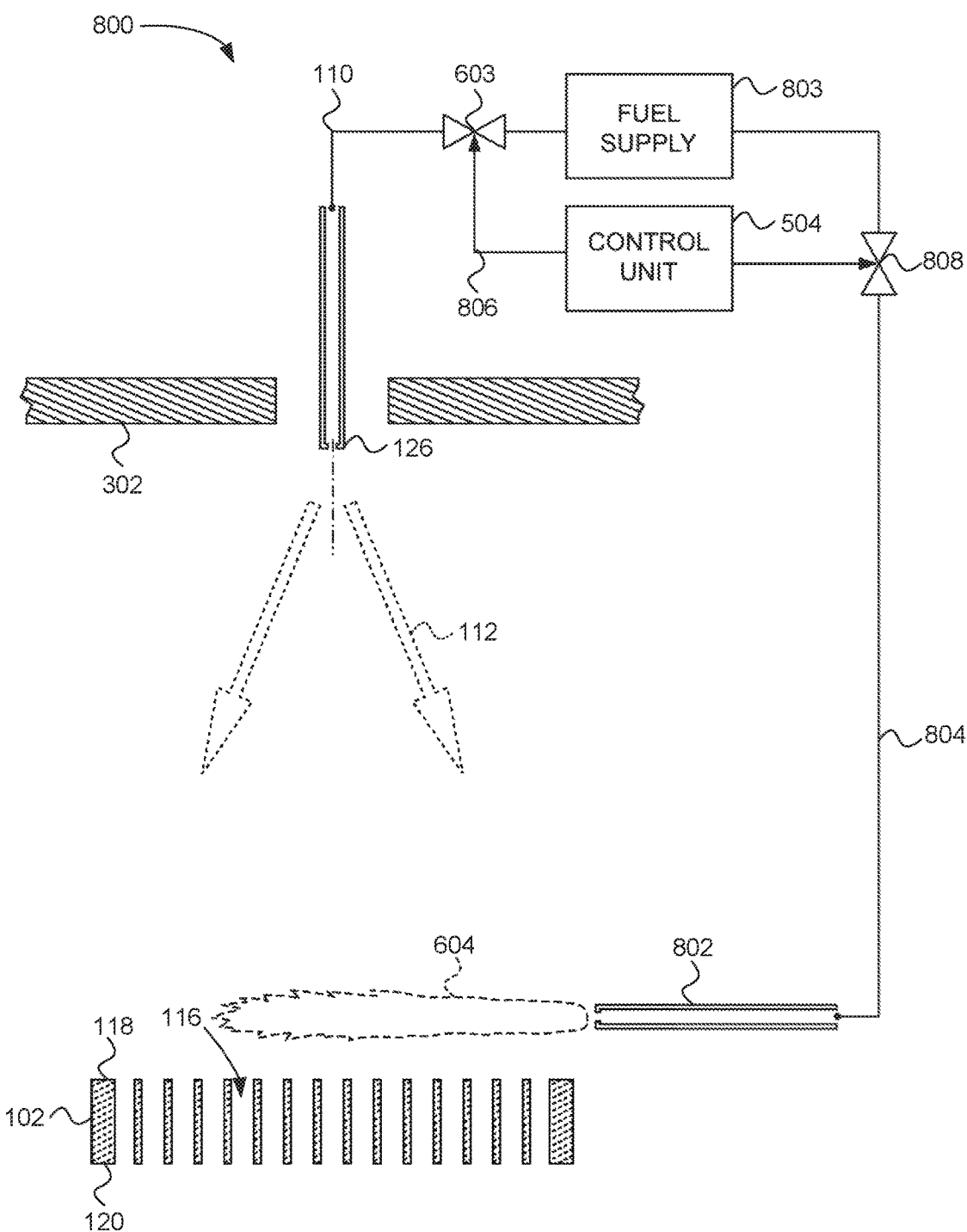
FIG. 8 is an illustration of a down-fired burner system including a perforated flame holder and a preheating mechanism, according to one embodiment.

FIG. 8 is a diagrammatic side sectional view of a down-fired burner 800, according to an embodiment. In the down-fired burner 800, the nozzle 126 is a primary nozzle, and the system further includes a secondary nozzle 802 positioned between the primary nozzle and the flame holder 102. The fuel supply 803 is coupled to the primary nozzle 126 and the secondary nozzle 802 via fuel lines 804. A primary fuel valve 603 controls a flow of fuel from the fuel supply 803 to the primary nozzle 126, and a secondary fuel valve 808 controls a flow of fuel from the fuel supply 803 to the secondary nozzle 802. The system control unit 504 is operatively coupled to the primary and secondary fuel valves 603, 808 via connectors 806.

In operation, when startup is initiated, the system control unit 504 controls the secondary fuel valve 808 to open—the primary fuel valve 603 is closed—and ignites a stream of fuel that exits the secondary nozzle 802, producing a startup flame 604 that is directly adjacent to the input surface 118 of the flame holder 102. The startup flame 604 heats a portion of the flame holder 102 to a temperature exceeding the startup threshold. When the system control unit 504 determines that a portion of the flame holder 102 exceeds the startup temperature threshold—via, for example, a signal from a temperature sensor, as described previously—the system control unit 504 controls the secondary fuel valve 808 to close, while controlling the primary fuel control valve 603 to open, causing a fuel stream 112 to be ejected by the primary nozzle 126. When the fuel and air mixture of the fuel stream 112 reaches the flame holder 102, a primary flame is ignited and normal operation follows, substantially as described with reference to previously embodiments.

Figure 9:
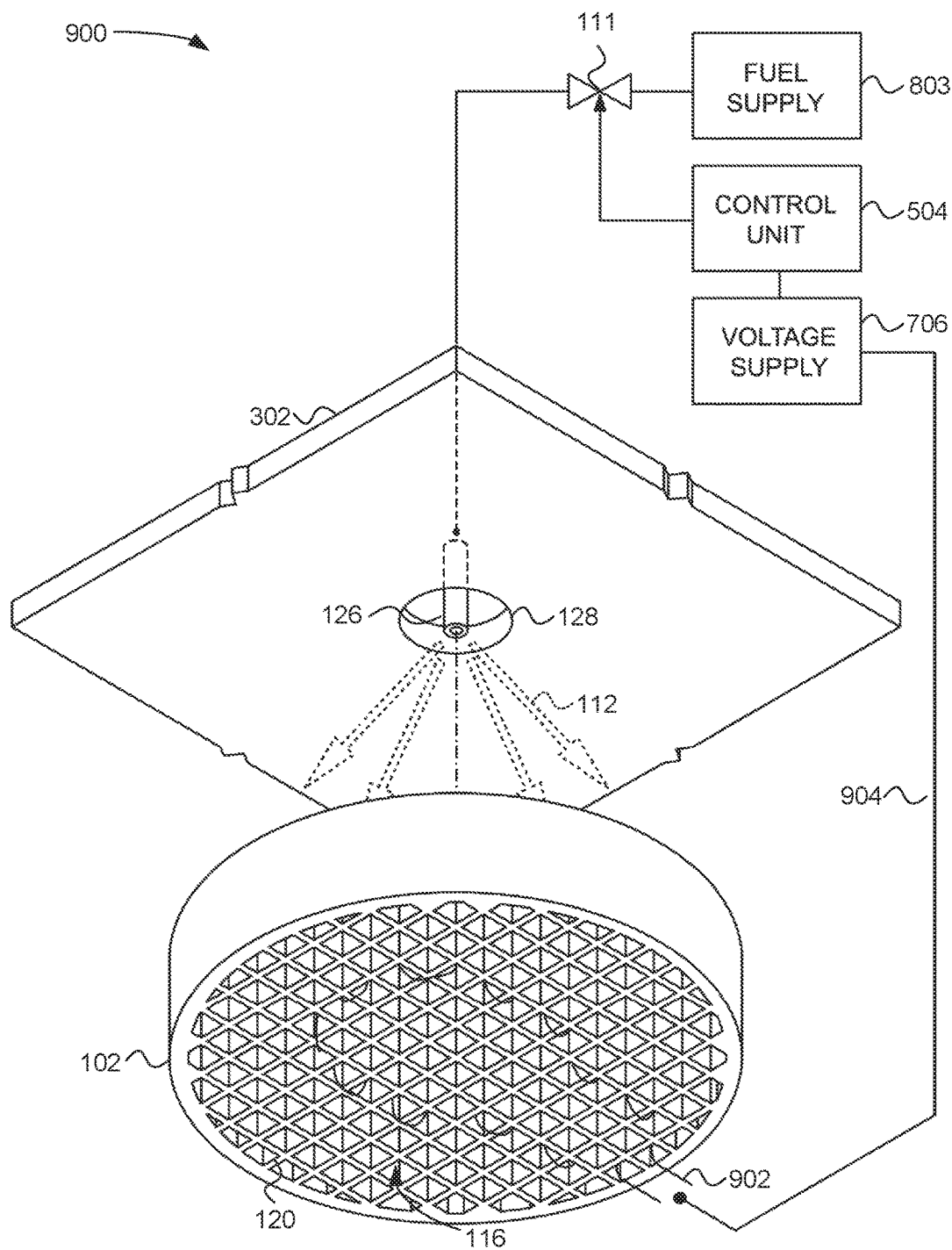
FIG. 9 is an illustration of a down-fired burner system including a perforated flame holder and a preheating mechanism, according to one embodiment.

FIG. 9 is a diagrammatic perspective view of a combustion system 900, according to an embodiment. The burner system 900 is similar in many respects to the system 100 described with reference to FIG. 1, and includes many of the same elements. However, the system 900 also includes an electrically resistive heating element 902. In the embodiment shown, the heating element 902 is in the form of a wire that is interleaved in and out through some of the plurality of perforations 116. The heating element 902 is operatively coupled to a voltage supply 706 via a connector 904. During a startup procedure, the system control unit 504 controls the voltage supply 706 to apply a voltage potential across the ends of the heating element 902. The resistance value of the heating element 902 and the magnitude of the voltage potential are selected to generate sufficient heat to raise the temperature of the portion of the flame holder 102 in the vicinity of the heating element to beyond the startup threshold within a few seconds, after which the system control unit 504 controls valve 603 to open, while controlling the voltage supply 706 to remove the voltage potential from the heating element 902. When the fuel stream 112 contacts the heated portion of the flame holder 102, auto-ignition occurs, and a stable flame is established in the flame holder 102. Thereafter, operation of the burner system 900 is substantially as described previously with reference to other embodiments.

Figure 10:
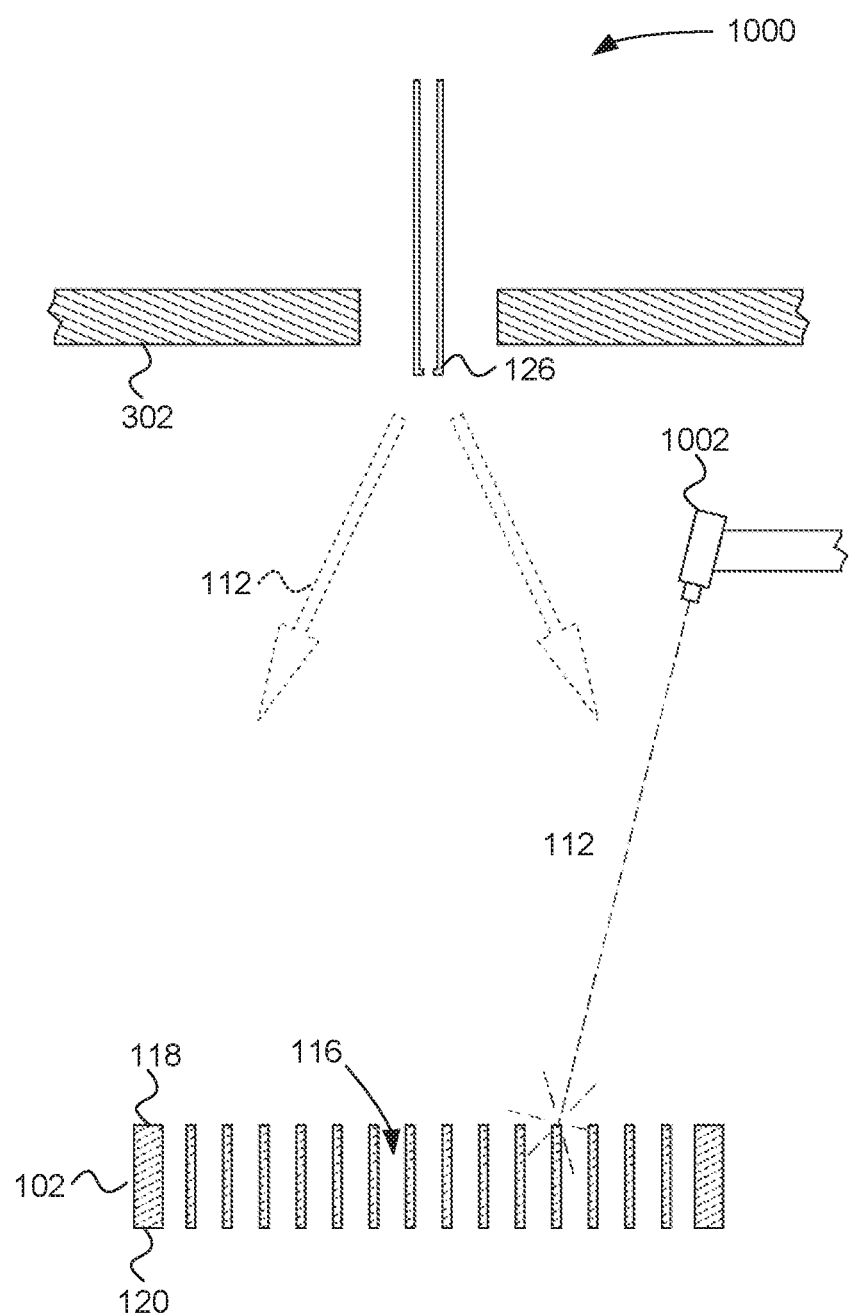
FIG. 10 is an illustration of a down-fired burner system including a perforated flame holder and a preheating mechanism, according to one embodiment.

FIG. 10 is a diagrammatical side view of a combustion system 1000, according to an embodiment. The combustion system 1000 includes a laser emitter 1002 positioned and configured to emit a laser beam that impinges in a portion of the input surface 118 of a flame holder 102. Photonic energy delivered by the laser beam is converted into thermal energy within the flame holder 102, thereby heating a portion of the flame holder 102. When the portion of the flame holder 102 exceeds the startup temperature threshold, fuel is sent to a nozzle 126 and ejected into a fuel stream toward the flame holder 102, and the laser 1002 is shut down. In the embodiment shown, the laser 1002 is held in a fixed position that is sufficiently removed from the flame holder 102 and fuel stream 112 as to cause no interference with normal operation of the system, and to be substantially unaffected by the environment. According to another embodiment, the laser emitter 1002 is positioned much closer to the input surface 118 of the flame holder 102 for more efficient energy transfer. Accordingly, the laser 1002 can also be retracted from the vicinity of the fuel stream when the system 1000 is not in startup mode.

FIG. 10 shows a laser emitter configured to transmit energy in a non-thermal form, which is converted to thermal energy upon impinging on the flame holder 102. According to various embodiments, other devices are configured to transmit non-thermal energy onto the flame holder 102 to be converted to thermal energy. For example, according to an embodiment, a microwave transmitter is positioned and configured to direct a microwave emission onto a surface of the flame holder 102. In that embodiment, the flame holder 102 includes a patch of material that is configured to absorb the microwave emission and to convert a portion of the transmitted energy to heat.

Figure 11:
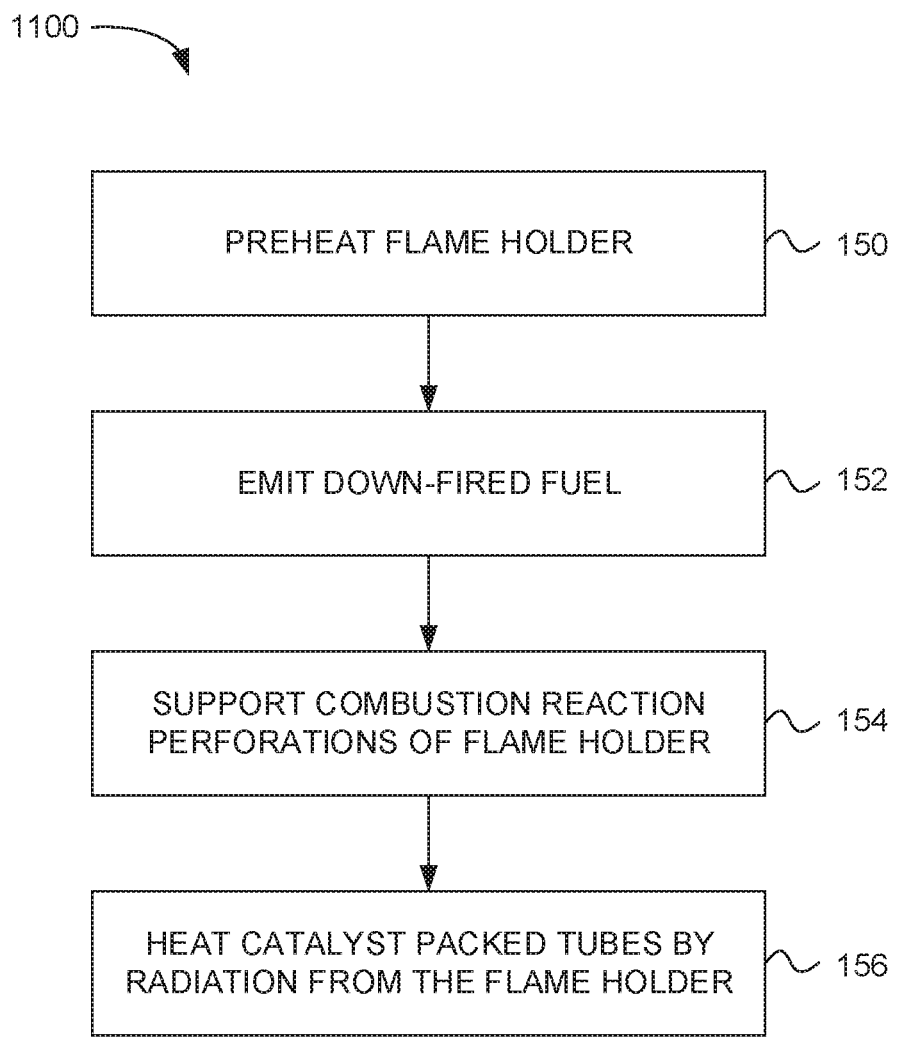
FIG. 11 is a flow diagram of a process for operating a down-fired burner system including a perforated flame holder and a pre-heating mechanism, according to one embodiment.

FIG. 11 is a flow diagram of a process for operating a down-fired burner including a perforated flame holder, according to one embodiment. At 150 the perforated flame holder is preheated to a threshold temperature at which a combustion reaction of the fuel mixture can occur spontaneously. When the perforated flame holder reaches a threshold temperature, at 152 fuel is emitted from a down-fired fuel nozzle. The perforated flame holder is positioned below the down-fired fuel nozzle such that the fuel expelled from the down-fired fuel nozzle contacts the perforated flame holder. Because the perforated flame holder has been preheated to the threshold temperature, the fuel begins to combust upon contacting the preheated flame holder. As fuel from the down-fired fuel nozzle continues to enter the perforations of the flame holder, the combustion reaction continues. At 154, the combustion reaction is supported primarily in the perforations of the perforated flame holder. This causes the perforated flame holder to continue to increase in temperature. At 156, as the flame holder increases in temperature heat is radiated from the flame holder to catalyst pack tubes positioned adjacent to the perforated flame holder. The catalyst pack tubes absorb heat from the flame holder without actually being contacted directly by the flame supported in the flame holder. Thus a catalyst positioned in the tube reacts with a reactant also positioned in the tube. Reaction product is passed from the tube.

In one embodiment, the process includes measuring the temperature of the flame holder and emitting the down-fired fuel from the fuel nozzle only after the measured temperature of the flame holder has passed the threshold temperature.

In one embodiment the perforated flame holder is preheated by preheating mechanism positioned adjacent the perforated flame holder. Preheating mechanism can include a laser that irradiates the flame holder with a high-intensity laser beam until at least a portion of the flame holder has reached the threshold temperature. Alternatively, the preheating mechanism can be a second burner that generates a flame adjacent flame holder thereby heating the flame holder to the threshold temperature before outputting fuel from the nozzle.

According to one embodiment, the preheating mechanism can also be an electrical resistor coupled to the perforated flame holder. A current is passed through the resistor, thereby generating heat. Because the perforated flame holder is in contact with the resistor, the perforated flame holder heats up while the current is passed through the resistor.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A down-fired burner comprising:
    a down-fired fuel nozzle configured to output fuel in a downward direction;
    an oxidant source configured to output an oxidant; and
    a flame holder positioned below the down-fired fuel nozzle, the flame holder including:
        an input surface facing the down-fired fuel nozzle;
        an output surface opposite the fuel nozzle; and
        a plurality of perforations extending from the input surface to the output surface and collectively configured to promote a combustion reaction of the fuel and oxidant within the perforations, wherein the flame holder is a refractory material.

2. The down-fired burner of claim 1, wherein the flame holder is configured to contain a majority of the combustion reaction within the perforations.

3. The down-fired burner of claim 1, wherein the flame holder is configured to contain 80% or more of the combustion reaction within the perforations.

4. The down-fired burner of claim 1, wherein the flame holder is an integral structure.

5. The down-fired burner of claim 1, wherein the flame holder is configured to initiate the combustion reaction.

6. A down-fired burner, comprising:
    a down-fired fuel nozzle configured to output fuel in a downward direction;
    an oxidant source configured to output an oxidant;
    a flame holder positioned below the down-fired fuel nozzle, the flame holder including:
        an input surface facing the down-fired fuel nozzle;
        an output surface opposite the fuel nozzle; and
        a plurality of perforations extending from the input surface to the output surface and collectively configured to promote a combustion reaction of the fuel and oxidant within the perforations; and
    a preheating mechanism configured to heat the flame holder prior to starting the combustion reaction.

7. The down-fired burner of claim 6, wherein the preheating mechanism comprises a second fuel nozzle configured to generate a flame adjacent to the flame holder.

8. The down-fired burner of claim 6, wherein the preheating mechanism comprises a laser configured to irradiate the flame holder.

9. The down-fired burner of claim 6, wherein the down-fired fuel nozzle is an adjustable nozzle and the preheating mechanism is configured to move the fuel nozzle closer to the flame holder during a preheating period and to retract the fuel nozzle after the preheating period.

10. The down-fired burner of claim 6, comprising:
    a temperature sensor configured to measure a temperature of the flame holder; and
    a control circuit coupled to the temperature sensor, the fuel nozzle, and the preheating mechanism and configured to cause the fuel nozzle to output the fuel when the temperature of the flame holder is above a threshold temperature.

11. The down-fired burner of claim 10, wherein the threshold temperature corresponds to a combustion temperature at which the flame holder can initiate combustion of the fuel within the perforations.

12. The down-fired burner of claim 6, comprising a control circuit coupled to the preheating mechanism and the fuel nozzle and configured to initiate the fuel nozzle after the preheating mechanism has operated for longer than a threshold time.

13. The down-fired burner of claim 6, wherein the preheating mechanism includes an electrical resistor coupled to the flame holder, the preheating mechanism being configured to heat the flame holder by passing a current through the electrical resistor.

14. A down-fired burner, comprising:
    a down-fired fuel nozzle configured to output fuel in a downward direction;
    an oxidant source configured to output an oxidant;
    a flame holder positioned below the down-fired fuel nozzle, the flame holder including:
        an input surface facing the down-fired fuel nozzle;
        an output surface opposite the fuel nozzle; and
        a plurality of perforations extending from the input surface to the output surface and collectively configured to promote a combustion reaction of the fuel and oxidant within the perforations; and
    a tube extending vertically adjacent to the flame holder and containing a catalyst.

15. The down-fired burner of claim 14, wherein the flame holder is configured to heat the tube and cause a reaction between the catalyst and a reactant in the tube.

16. The down-fired burner of claim 14, wherein the tube comprises:
    a first vertical portion;
    a second vertical portion; and
    a connecting portion connecting the first vertical portion to the second vertical portion such that the tube is substantially in a U shape.

17. The down-fired burner of claim 16, wherein the tube comprises:
    an input configured to pass reactant into the first vertical portion; and
    an output configured to pass from the second vertical portion a reaction product of the reactant and the catalyst.

18. The down-fired burner of claim 16, wherein the flame holder is positioned between the first and second vertical portions of the tube.

19. The down-fired burner of claim 1, wherein the perforations are isolated from each other by a body of the flame holder.

20. The down-fired burner of claim 1, wherein the input and output surfaces of the flame holder are substantially rectangular.

21. The down-fired burner of claim 1, wherein the input and output surfaces of the flame holder are circular, elliptical, or ovular.

22. The down-fired burner of claim 1, wherein a width of the flame holder in a horizontal direction is more than twice as large as a thickness of the flame holder in a vertical direction.

23. A method comprising:
heating a flame holder positioned within a combustion volume and having a plurality of perforations each extending from a top surface of the flame holder to a bottom surface of the flame holder, wherein the flame holder is of a refractory material;
outputting fuel from a first nozzle in a downward direction onto a top surface of the flame holder;
introducing an oxidant into the combustion volume;
igniting a combustion reaction of the fuel and oxidant in the plurality of perforations; and
containing the combustion reaction of the fuel and oxidant substantially in the perforations in the flame holder.

24. The method of claim 23, comprising:
measuring a temperature of the flame holder; and
outputting the fuel onto the flame holder after the temperature of the flame holder has reached a threshold temperature.

25. The method of claim 24, wherein the threshold temperature is a temperature at which the flame holder will ignite the combustion reaction within the perforations.

26. The method of claim 23, wherein heating the flame holder comprises applying heat to the flame holder by a preheating mechanism positioned adjacent to the flame holder.

27. The method of claim 23, comprising heating the flame holder by irradiating the flame holder with a laser.

28. The method of claim 23, comprising heating the flame holder with a second fuel nozzle positioned adjacent to the flame holder.

29. The method of claim 23, comprising heating the flame holder by passing a current through an electrical resistor coupled to the flame holder.

30. A method, comprising:
heating a flame holder positioned within a combustion volume and having a plurality of perforations each extending from a top surface of the flame holder to a bottom surface of the flame holder;
outputting fuel from a first nozzle in a downward direction onto a top surface of the flame holder;
introducing an oxidant into the combustion volume;
igniting a combustion reaction of the fuel and oxidant in the plurality of perforations;
containing the combustion reaction of the fuel and oxidant substantially in the perforations in the flame holder;
passing a reactant through a reactor tube positioned adjacent to the flame holder; and
causing a reaction between the reactant and a catalyst in the tube by radiating heat onto the tube from the flame holder.

31. The method of claim 30, wherein the flame holder is positioned between the first and second vertical portions of the tube.

32. The method of claim 31, wherein a connecting portion of the tube connects the first and second vertical portions and is positioned below the flame holder.

33. The method of claim 23, comprising outputting oxygen in a downward direction from a second nozzle onto the top surface of the flame holder.

34. The method of claim 23, wherein introducing the oxidant includes outputting oxygen in an airstream.

35. A method, comprising:
heating a flame holder positioned within a combustion volume and having a plurality of perforations each extending from a top surface of the flame holder to a bottom surface of the flame holder;
outputting fuel from a first nozzle in a downward direction onto a top surface of the flame holder;
introducing an oxidant into the combustion volume;
igniting a combustion reaction of the fuel and oxidant in the plurality of perforations; and
containing the combustion reaction of the fuel and oxidant substantially in the perforations in the flame holder, wherein the combustion reaction is a reaction of the fuel with oxygen.

36. The method of claim 23, wherein the perforations are isolated from each other by a body of the flame holder.

37. A system comprising:
a plurality of downward facing fuel nozzles each of which is configured to output a fuel in a downward direction;
one or more oxidant sources configured to output oxidant;
a plurality of flame holders each of which is positioned below a respective downward facing fuel nozzle, each flame holder including:
a top surface;
a bottom surface; and
a plurality of perforations between the top and bottom surfaces, the flame holders being configured to confine a majority of a combustion reaction of the fuel and oxidant within the perforations, wherein the flame holder is of a refractory material; and
a plurality of tubes, each of which is positioned adjacent to a respective flame holder and to output a reaction product of a reaction between a reactant and a catalyst within the tube.

38. The system of claim 37, wherein at least a majority of the tubes are positioned adjacent to four respective flame holders.

39. The system of claim 37, wherein each tube is packed with the catalyst and is configured to receive the reactant in a first vertical portion of the tube to output the reaction products from a second vertical portion of the tube.

40. The system of claim 37, wherein the perforations of each flame holder are isolated from each other.

41. The system of claim 40, wherein each flame holder is configured to convey heat between the plurality of perforations.

42. A system, comprising:
a plurality of downward facing fuel nozzles each of which is configured to output a fuel in a downward direction;
one or more oxidant sources configured to output oxidant;
a plurality of flame holders each of which is positioned below a respective downward facing fuel nozzle, each flame holder including:
a top surface;
a bottom surface; and
a plurality of perforations between the top and bottom surfaces, the flame holders being configured to confine a majority of a combustion reaction of the fuel and oxidant within the perforations;
a plurality of tubes, each of which is positioned adjacent to a respective flame holder and to output a reaction product of a reaction between a reactant and a catalyst within the tube; and
a plurality of preheating mechanisms each positioned adjacent to a respective flame holder and configured to preheat the respective flame holder to a threshold temperature prior to outputting the fuel from the respective fuel nozzle.

43. The system of claim 42, wherein the threshold temperature is an auto-ignition temperature of the fuel plus an additional temperature elevation selected to prevent initial cooling by fuel and combustion air from lowering the temperature of the flame holder to a temperature below the auto-ignition temperature.

\* \* \* \* \*